(12) United States Patent
Hudson

(10) Patent No.: US 6,732,990 B2
(45) Date of Patent: May 11, 2004

(54) TRAY AND CUP HOLDER COMBINATION

(76) Inventor: James K Hudson, 3204 Milton, Dallas, TX (US) 75205

( * ) Notice: Subject to any disclaimer, the term of this patent is extended or adjusted under 35 U.S.C. 154(b) by 0 days.

(21) Appl. No.: 09/876,313

(22) Filed: Jun. 7, 2001

(65) Prior Publication Data

US 2002/0185578 A1 Dec. 12, 2002

(51) Int. Cl.⁷ .............................. A47K 1/08; B65D 1/34
(52) U.S. Cl. .................... 248/311.2; 248/548; 224/926; 206/503; 206/514; 206/562
(58) Field of Search ................. 248/311.2, 310, 248/309.1, 313, 314, 544, 548, 900; 224/483, 926; 206/503, 515, 549, 562, 563, 564, 217; 108/25, 26, 44

(56) References Cited

U.S. PATENT DOCUMENTS

| 1,872,491 | A | * | 8/1932 | Noetzel ................. 248/231.51 |
| 2,063,289 | A | * | 12/1936 | Alusas .......................... 211/73 |
| 4,208,006 | A | * | 6/1980 | Bixler et al. ................ 206/564 |
| 4,524,701 | A | * | 6/1985 | Chappell ..................... 108/44 |
| 4,798,413 | A | | 1/1989 | Capelli ........................ 297/194 |
| 4,969,618 | A | | 11/1990 | Thompson .................. 248/152 |
| 5,114,108 | A | * | 5/1992 | Olschansky ................. 108/46 |
| 5,118,063 | A | | 6/1992 | Young ..................... 248/311.2 |
| 5,135,195 | A | * | 8/1992 | Dane .......................... 248/310 |
| 5,282,598 | A | * | 2/1994 | Greene ....................... 224/275 |
| 5,330,145 | A | * | 7/1994 | Evans et al. ................ 224/547 |
| D353,289 | S | * | 12/1994 | Ayotte et al. ................ D6/510 |
| 5,421,459 | A | * | 6/1995 | Mazzotti .................... 206/549 |
| 5,573,301 | A | | 11/1996 | Scott ......................... 297/173 |
| 5,601,268 | A | * | 2/1997 | Dunchock .................. 224/926 |
| 5,651,523 | A | | 7/1997 | Bridges .................. 248/311.2 |
| D382,727 | S | * | 8/1997 | Kresge et al. ............ D6/406.5 |
| 5,702,041 | A | | 12/1997 | Sun ............................ 224/539 |
| 5,713,628 | A | * | 2/1998 | Lucatuorto ............. 297/188.05 |
| 5,865,124 | A | | 2/1999 | Wroe .......................... 108/26 |
| 5,897,041 | A | * | 4/1999 | Ney et al. .................. 224/483 |
| 5,953,999 | A | * | 9/1999 | Kanehl ........................ 108/44 |
| 5,971,139 | A | * | 10/1999 | Bradley ..................... 206/217 |
| 6,036,020 | A | * | 3/2000 | Distler ....................... 206/217 |
| 6,109,580 | A | | 8/2000 | Stern et al. ............. 248/311.2 |
| 6,113,049 | A | | 9/2000 | Miljanich ................ 248/311.2 |
| 6,142,559 | A | | 11/2000 | Sorel .......................... 297/135 |
| 6,264,026 | B1 | * | 7/2001 | Bradley ..................... 206/217 |
| 6,360,885 | B1 | * | 3/2002 | Krueger et al. ............. 206/217 |
| 6,361,009 | B1 | * | 3/2002 | Li ........................... 248/311.2 |
| 6,401,927 | B1 | * | 6/2002 | Sorensen et al. ........... 206/216 |
| 6,425,480 | B1 | * | 7/2002 | Krueger et al. ............. 206/217 |
| 6,511,030 | B1 | * | 1/2003 | Kelley ..................... 248/309.1 |
| 6,533,233 | B2 | * | 3/2003 | Thomas ................... 248/311.2 |
| 2002/0043603 | A1 | * | 4/2002 | Thomas ................... 248/311.2 |
| 2003/0141424 | A1 | * | 7/2003 | Thomas ................... 248/311.2 |

* cited by examiner

Primary Examiner—Leslie A. Braun
Assistant Examiner—Naschica S. Morrison
(74) Attorney, Agent, or Firm—Rudolf O. Siegesmund

(57) ABSTRACT

The present invention is a tray assembly comprising a holder, at least one tray, at least one securement device, and at least one support element. The holder is designed to fit into the cup holder in an automotive car console and accommodates one beverage container. The trays are joined to and extend outwardly from the holder and accommodate at least one food item. At least one tray is downwardly recessed to better accommodate the food items. The tray assembly is designed so that a plurality of the tray assemblies can be stacked together vertically. The arrangement of the trays is asymmetrical in such a way that a plurality of trays can be placed in closer proximity to a person or object, but do not upset the overall balance of the tray. The tray assembly contains at least one aperture in at least one tray, wherein the aperture acts as a receptacle for at least one container and maintains the containers in the vertical position. The securement devices are joined to the holder and allow the tray assembly to conform to the shape of the automotive cup holder. The support elements provide structural integrity to the tray assembly. The support elements may extend either upwardly or downwardly from the tray assembly.

36 Claims, 3 Drawing Sheets

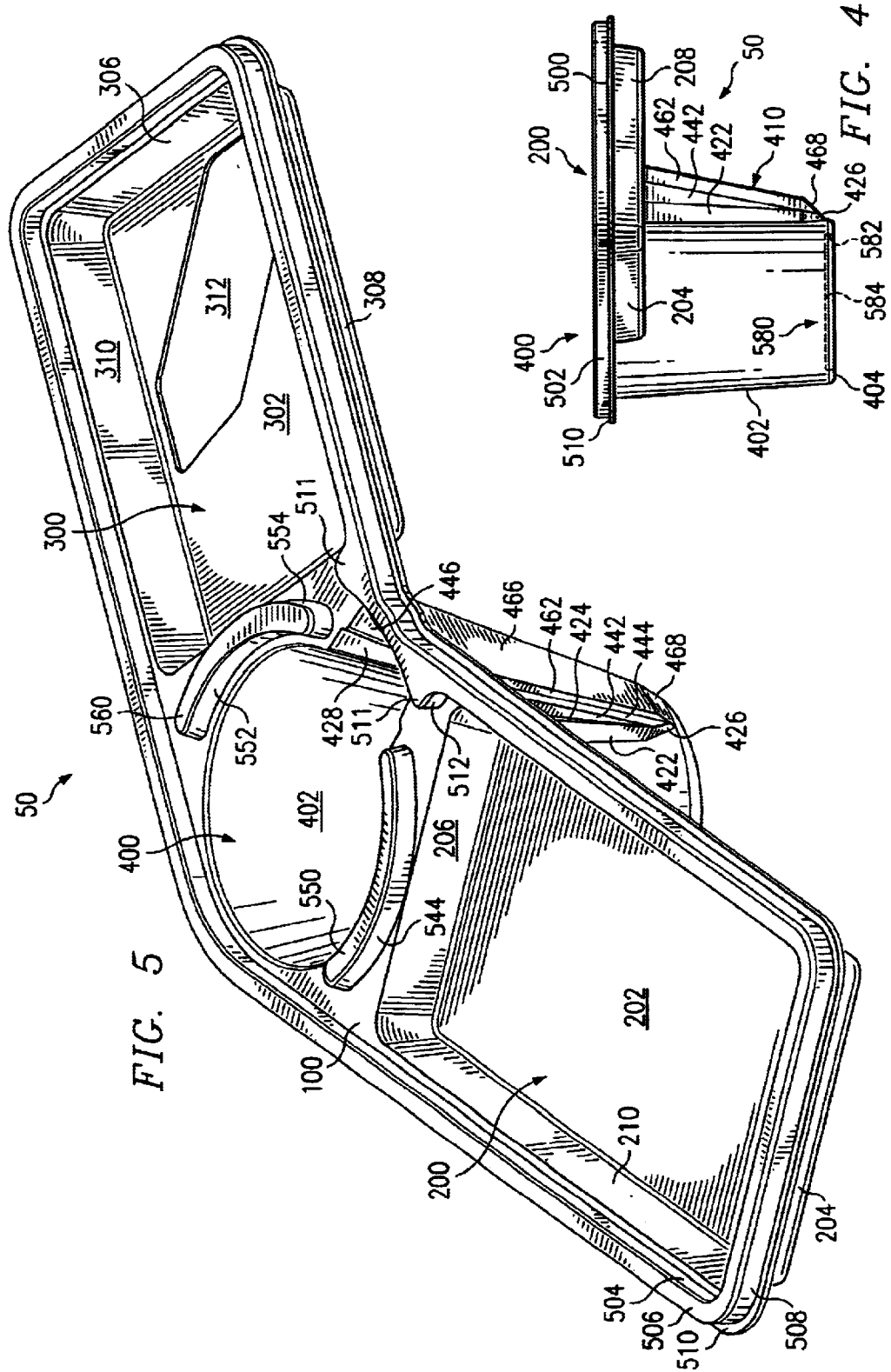

TRAY AND CUP HOLDER COMBINATION

FIELD OF INVENTION

The present invention is directed, in general, to a tray and cup holder combination adapted for insertion into the cup holding recess of an automotive console.

BACKGROUND OF THE INVENTION

Food purchased at a drive-through restaurant may be eaten while driving. Cup holders are frequently placed in the consoles of automobiles. However, there is still no place to put food such as may be purchased at the drive-through. Disposable food and drink containers are used by drive-through restaurants. A need exists for a disposable cup and tray combination that can hold food items like hamburgers, french fries, and a drink.

U.S. Pat. No. 5,651,523 (the '523 patent) discloses an "Article Support System Having Multiple Utilities" having two-piece construction, one tray, and a number of concentric cylinders of varying diameter. The weight of the tray and its contents causes the part of the tray designed to fit into the cup holder to bind against the automotive cup holder. (See the '523 patent, FIG. 4) A need exists beyond the '523 patent for a combination cup holder and tray with a simple and inexpensive means of attachment to an automotive cup holder.

U.S. Pat. No. 6,109,580 (the '063 patent) discloses a "Food And Beverage Tray Supportable By A Cupholder," which provides a combination of three cup holders and a single tray. The '580 patent is limited to fit one size of cup holder. A need exists beyond the '580 patent for a combination cup holder and tray that can fit different sizes of cup holders and that can support more than one tray.

U.S. Pat. No. 5,118,063 (the '063 patent) discloses a "Concession Tray" having a single tray with one-piece construction. A need exists beyond the '063 patent for a tray and cup holder combination that can support a plurality of trays.

Therefore, a need exists beyond the prior art for a tray and cup holder combination that is inexpensive to manufacture, adaptable to a variety of vehicle console cup holders, and that can support at least one tray. An invention is needed that can accommodate all of these requirements in an effective manner.

SUMMARY OF THE INVENTION

The invention that meets the needs identified above is a tray and cup holder assembly having a main tray, a holder, a plurality of trays, and at least one structural support. The holder consists of an inverted truncated cone joined to the main tray and closed at the bottom and is adapted for insertion into the cup holder of an automotive console. At least one tray has a recess adapted to hold the food items and the trays are arranged asymmetrically. Each tray is generally rectangular in shape and preferably has rounded corners. At least one tray has at least one aperture having a size and orientation designed to hold a container such as a french fry container. A crushable extension is joined to the holder and allows the holder to conform to the shape of the automotive cup holder. Alternatively, the crushable extension may be a pad affixed to the holder by an adhesive to the outside wall of the cup holder section along the longitudinal axis. A circumferential support, a supplemental support, two inner supports, and a disc support provide structural integrity to the tray assembly. The novel configuration of the tray and cup holder combination makes it inexpensive to manufacture, adaptable to a variety of vehicle console cup holders, and that can support at least one tray.

BRIEF DESCRIPTION OF DRAWINGS

The features of the present invention, which are believed to be novel, are set for the in particularity in the description of preferred embodiments. The following drawings reference the many parts of the invention and are useful in comprehension of the invention as a whole.

FIG. 4 is a left side elevation view of the preferred embodiment of the Tray and Cup Holder Combination.

FIG. 5 is a prospective view of the preferred embodiment of the Tray and Cup Holder Combination.

DESCRIPTION OF PREFERRED EMBODIMENTS

Figure 1:
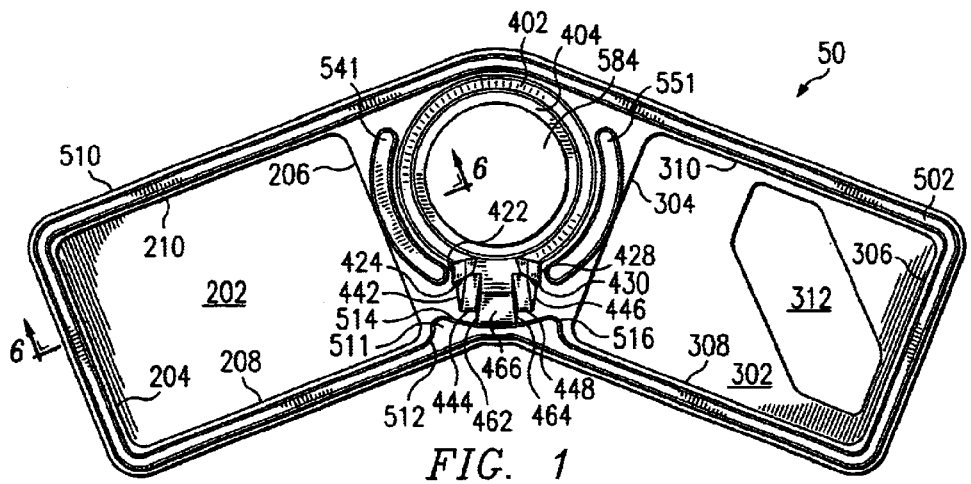
FIG. 1 is a plan view of the preferred embodiment of the Tray and Cup Holder Combination.
Figure 2:
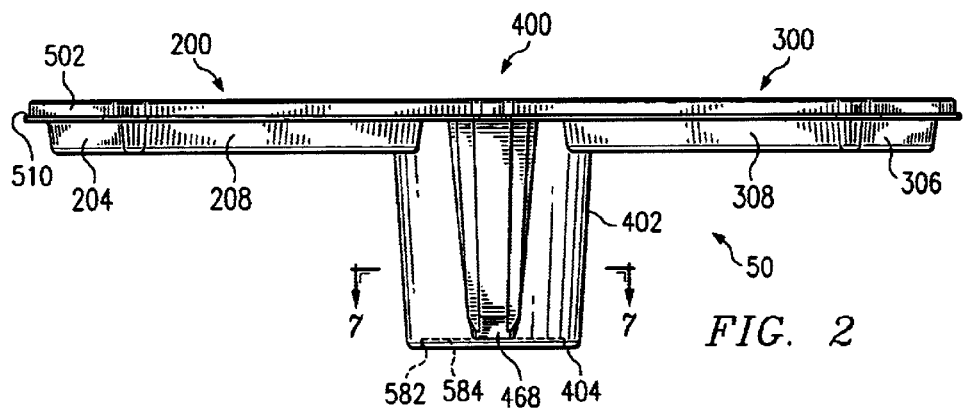
FIG. 2 is a front elevation view of the preferred embodiment of Tray and Cup Holder Combination showing the crushable extension.

FIG. 1 shows Tray and Cup Holder Combination 50 in its preferred embodiment. Generally, Tray and Cup Holder Combination 50 comprises main tray 100, left tray section 200, right tray section 300, holder 400, circumferential support 500, supplemental support 511, left inner support 541, and right inner support 551. Main tray 100 is approximately perpendicular to the cylindrical axis of the automotive cup holder. Specifically, main tray 100 joins circumferential support interior wall 504, left tray front wall 208, left tray exterior wall 204, left tray rear wall 210, left tray interior wall 206, right tray front wall 308, right tray exterior wall 306, right tray rear wall 310, right tray interior wall 304, left inner support exterior wall 544, left inner support exterior wall 544, right inner support interior wall 552, right inner support exterior wall 554, holder wall 402, supplemental support left wall 512, supplemental support center wall 514, supplemental support right wall 516, first tier left wall 422, first tier left face 424, second tier left wall 442, second tier left face 444, third tier left wall 462, first tier right wall 428, first tier right face 430, second tier right wall 446, second tier right face 448, third tier right wall 464, and third tier face 466. The preferred embodiment of Tray and Cup Holder Combination 50 is made of one piece construction and has rounded corners.

Tray and Cup Holder Combination 50 contains left tray section 200, which projects downward from main tray 100. Specifically, left tray section 200 is composed of left tray 202 parallel to main tray 100. Left tray exterior wall 204, left tray interior wall 206, left tray front wall 208, and left tray rear wall 210 extend downward from and approximately perpendicular to main tray 100. Left tray 202 is generally rectangular in shape, but may be formed in a variety of shapes including, but not limited to, triangular, pentagonal, hexagonal, octagonal, circular and the like.

Likewise, Tray and Cup Holder Combination 50 contains right tray section 300, which projects downward from main tray 100. Right tray section 300 has right tray 302 parallel to main tray 100. Right tray exterior wall 306, right tray interior wall 304, right tray front wall 308, and right tray rear wall 310 extend downward from and approximately perpendicular to main tray 100. Right tray 302 contains right tray aperture 312. Right tray aperture 312 is adapted to receive a generally rectangular container and hold the container in the vertical position. In the preferred embodiment, right tray aperture 312 is adapted to receive and hold a box of french fries (not shown) in the vertical position. The box (not shown) is inserted into right tray aperture 312 and is contained by the gradually increasing cross-sectional area of the box contacting right tray aperture 312. Right tray section 300 is generally rectangular in shape, but may be any of a variety of shapes including, but not limited to, triangular, pentagonal, hexagonal, octagonal, and the like.

Figure 3:
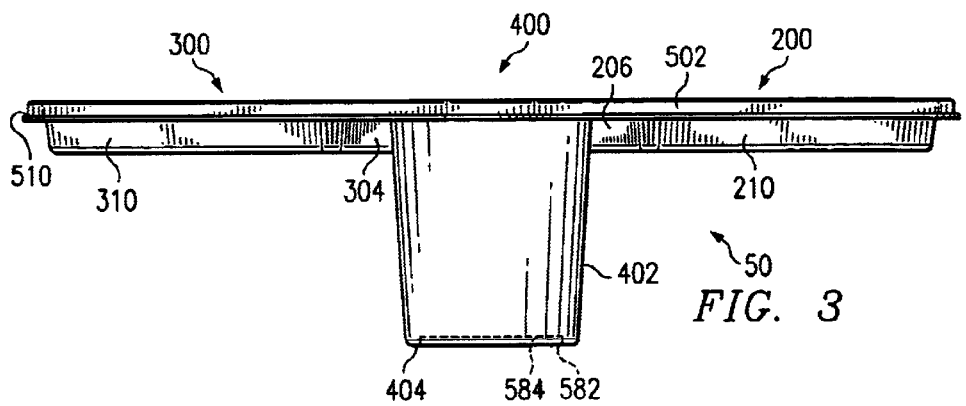
FIG. 3 is a rear elevation view of the preferred embodiment of the Tray and Cup Holder Combination.

As seen in FIG. 3, Tray and Cup Holder Combination 50 also contains holder 400, which projects downward from and approximately perpendicular to main tray 100. Holder 400 consists of holder wall 402, which extends downward from and approximately perpendicular to main tray 100, and holder base 404, which is parallel to main tray 100. Holder 400 also contains disc support 580, which extends concentrically upwards from holder base 404. Disc support 580 secures a beverage cup (not shown) in holder 400 so that the beverage cup will not slide along holder base 404. Holder wall 402 is smaller at the base than at the top in such a manner that it resembles an inverted truncated cone. Holder base 404 connects holder wall 402 and disc support wall 582, which is concentric with holder wall 402 and extends upwards from holder base 404. Disc support wall 582 joins disc support base 584 and disc support base 584 is parallel to main tray 100.

Figure 7:
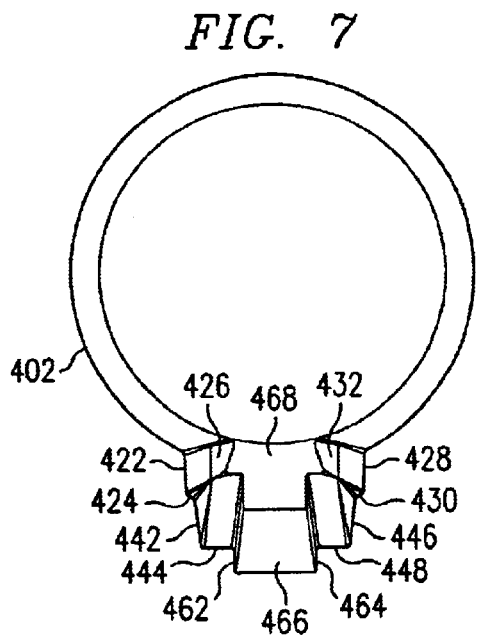
FIG. 7 is a section view of the preferred embodiment of Tray and Cup Holder Combination taken along line 7—7 of FIG. 2 showing the crushable extension and the holder.

Crushable extension 410 extends outward from holder wall 402 and from holder base 404 to main tray 100. Crushable extension 410 has three tiers of elements as illustrated in FIG. 7. These tiers taper closer to holder wall 402 as they approach the base of holder 400 as illustrated in FIG. 4. First tier left wall 422 and first tier right wall 428 are joined at an approximate right angle to holder wall 402. First tier left face 424 is joined at an approximate right angle to first tier left wall 422. First tier right face 430 is joined at an approximate right angle to first tier right wall 428. Second tier left wall 442 is joined approximately perpendicular to first tier left face 424. Second tier right wall 446 is joined approximately perpendicular to first tier right face 430. Second tier left face 444 is joined approximately perpendicular to second tier left wall 442. Second tier right face 448 is joined approximately perpendicular to second tier right wall 446. Third tier left wall 462 is joined approximately perpendicular to second tier left face 444. Third tier right wall 464 is joined approximately perpendicular to second tier right face 448. Third tier face 466 is joined approximately perpendicular to both third tier left wall 462 and third tier right wall 464. Third tier apex face 468 projects inwardly and downwardly from third tier face 466 to holder wall 402. Third tier apex face 468 also joins on its left side with first tier left apex face 426 and on its right side with first tier right apex face 432. First tier left apex face 426 joins with holder wall 402, first tier left wall 422, second tier left face 444, third tier apex face 468 and tapers towards third tier apex face 468. First tier right apex face 432 connects with holder wall 402, first tier right wall 428, second tier right face 448, and third tier apex face 468 and tapers toward third tier apex face 468.

Holder 400 is guided into the automobile's cup holder by holder base 404 and third tier apex face 468. As holder 400 is inserted into the automobiles cup holder (not shown), third tier face 466 and holder wall 402 will come into contact with the inside walls of the cup holder. When this happens, the continued application of force on the top of Tray and Cup Holder Combination 50 will force crushable extension 410 to deform and assume the shape of the inside wall of the cup holder. The deformation of crushable extension 410 provides a secure fit of Tray and Cup Holder Combination 50 into the cup holder of the automobile.

Figure 6:
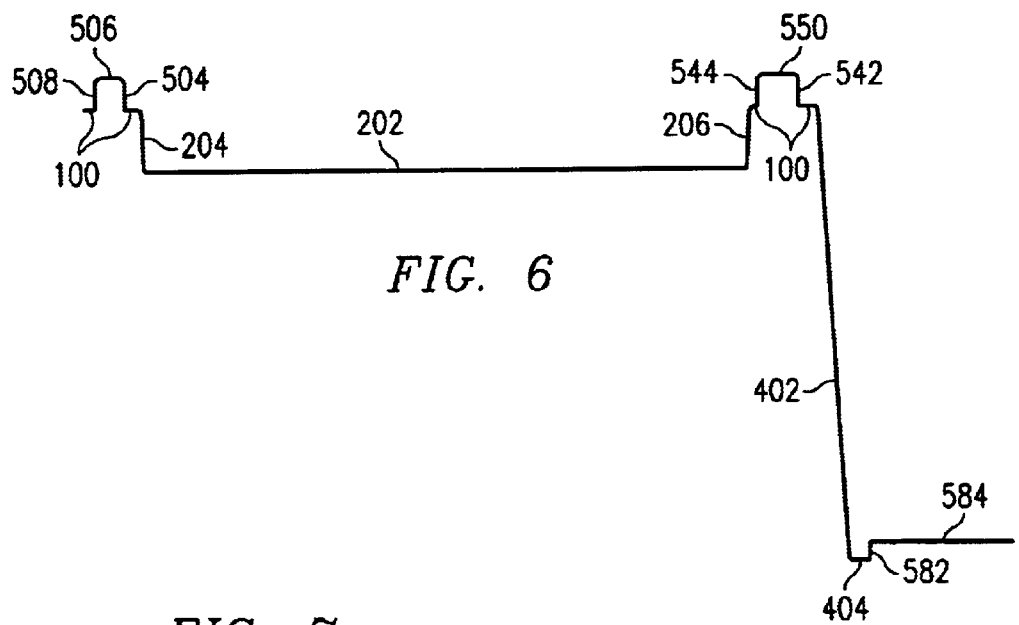
FIG. 6 is a section view of the preferred embodiment of the Tray and Cup Holder Combination taken along line 6—6 of FIG. 1 showing the recessed portions of the circumferential structural support, the left inner support, and the disc support.

Tray and Cup Holder Combination 50 also contains a plurality of supports that provide structural integrity. Circumferential support 500 is joined along the perimeter of Tray and Cup Holder Combination 50 and extends upwardly from main tray 100. As seen in FIG. 6, circumferential support 500 has circumferential support interior wall 504 extending upwardly from and approximately perpendicular to main tray 100, circumferential support cross-member 506 extending parallel to main tray 100, circumferential support exterior wall 508 extending parallel to circumferential support interior wall 504, and lateral extension 510 extending parallel to and coplanar with main tray 100.

Supplemental support 511 is an extension of circumferential support cross-member 506 near crushable extension 410. Supplemental support 511 consists of supplemental support left wall 512, supplemental support center wall 514, and supplemental support right wall 516, each extending upwardly from and approximately perpendicular to main tray 100. Supplemental support 511 adds structural integrity to Tray and Cup Holder Combination 50.

Tray and Cup Holder Combination 50 contains left inner support 541 and right inner support 551. Left inner support extends upward from main tray 100 and consists of left inner support interior wall 542 and left inner support exterior wall 544 extending upwardly from an approximately parallel to main tray 100, and left inner support cross-member 550, which is parallel to main tray 100 and joins left inner support interior wall 542 and left inner support exterior wall 544. Left inner support 541 provides structural integrity to Tray and Cup Holder Combination 50 when a load is placed upon left tray section 200.

Likewise, right inner support 551 extends upward from main tray 100 and consists of right inner support interior wall 552, right inner support exterior wall 554, both of which extend upwardly from and are approximately perpendicular to main tray 100, and right inner support cross-member 560, which is parallel to main tray 100 and joins right inner support interior wall 552 and right inner support exterior wall 554. Right inner support 551 provides structural integrity to Tray and Cup Holder Combination 50 when a load is placed upon right tray section 300.

Figure 8:
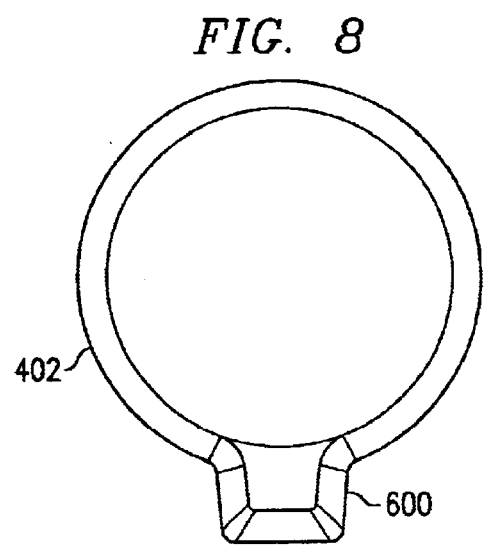
FIG. 8 is a section view of an alternative embodiment of the Tray and Cup Holder Combination taken along line 7—7 of FIG. 2 showing a pad adhered to the holder instead of the crushable extension.

As seen in FIG. 8, an alternative embodiment of Tray and Cup Holder Combination 50 replaces crushable extension 410 with at least one pad 600. Pad 600 is attached to holder wall 402 by an adhesive suitable for securing pad 600 to Tray and Cup Holder Combination 50. Pad 600 may be made of foam, felt, or another suitable material that is capable of being deformed upon being inserted into the cup holder.

It is to be understood that while certain forms of the preferred embodiment of Tray and Cup Holder Combination 50 have been described herein, it is not to be limited to the specific forms or arrangement of parts described and shown here except insofar as such forms are included in the following claims.

What is claimed is:

1. A tray assembly adapted for engagement to an automotive cup holder comprising:
   a holder having a holder axis;
   a tray perpendicularly joined to the holder;
   a crushable extension attached to an outside wall of said holder and oriented along a crushable extension axis, said crushable extension extending downwardly from said tray to the bottom of said holder and comprising:
     a plurality of tier walls extending outwardly from said holder;
     a plurality of tier faces perpendicularly joined to said tier walls; and
     an extension face perpendicularly joined to said tier walls;
   wherein said tier walls and said tier faces form a pair of stair-stepped sidewalls of said crushable extension;
   wherein said holder axis is in a vertical position;
   wherein an inside surface of said holder is sized to engage a beverage container; and
   wherein said crushable extension allows the tray assembly to conform to the shape of the automotive cup holder.

2. The tray assembly as set forth in claim 1 further comprising a circumferential support element extending upwardly from the tray assembly.

3. The tray assembly as set forth in claim 1 further comprising a circumferential support element extending downwardly from the tray assembly.

4. The tray assembly as set forth in claim 1 further comprising a circumferential support having a supplemental support.

5. The tray assembly as set forth in claim 1 further comprising a left inner support and a right inner support.

6. The tray assembly as set forth in claim 1 where said tray is downwardly recessed.

7. The tray assembly of claim 1 further comprising:
   a second tray perpendicularly joined to said holder; and
   wherein an angle created by said tray and said second tray is obtuse.

8. The tray assembly of claim 1 further comprising an aperture disposed within said tray; wherein said aperture is sized to engage a food container.

9. The tray assembly of claim 8 wherein said aperture is hexagonal.

10. The tray assembly of claim 1 wherein said holder is substantially cylindrical and said holder axis and said crushable extension axis are substantially parallel.

11. The tray assembly of claim 1, wherein said holder is shaped like an inverted, truncated cone and wherein said holder axis and said crushable extension axis form an acute angle.

12. The tray assembly of claim 1 wherein said crushable extension is a pad.

13. A tray assembly adapted for engagement to an automotive cup holder comprising:
   a holder having a holder axis;
   a tray perpendicularly joined to the holder and having a tray plane, wherein the tray connects to and extends outwardly from the holder and can support various items;
   a crushable extension attached to an outside wall of said holder and oriented along a crushable extension axis, said crushable extension extending downwardly from said tray to the bottom of said holder and comprising:
     a plurality of tier walls extending outwardly from said holder;
     a plurality of tier faces perpendicularly joined to said tier walls; and
     an extension face perpendicularly joined to said tier walls;
   wherein said tier walls and said tier faces form a pair of stair-stepped sidewalls of said crushable extension;
   wherein said holder axis is in a vertical position;
   wherein an inside surface of said holder is sized to engage a beverage container;
   wherein said crushable extension axis is perpendicular to said tray plane when said crushable extension axis is viewed in alignment with said holder axis; and
   wherein said crushable extension allows the tray assembly to conform to the shape of the automotive cup holder or a general recess.

14. The tray assembly as set forth in claim 13 further comprising a circumferential support element extending upwardly from the tray assembly.

15. The tray assembly as set forth in claim 13 further comprising a circumferential support element extending downwardly from the tray assembly.

16. The tray assembly as set forth in claim 13 further comprising a circumferential support having a supplemental support.

17. The tray assembly as set forth in claim 13 further comprising a left inner support and a right inner support.

18. The tray assembly as set forth in claim 13 wherein said tray is downwardly recessed.

19. The tray assembly as set forth in claim 13 further comprising an aperture in said tray, wherein the aperture acts as a receptacle for a food container and maintains the food container in a vertical position.

20. The tray assembly of claim 19 wherein said aperture is hexagonal.

21. The tray assembly of claim 13 further comprising:
   a second tray perpendicularly joined to said holder; and
   wherein an angle created by said tray and said second tray is obtuse.

22. The tray assembly of claim 13 wherein said holder is substantially cylindrical and said holder axis and said crushable extension axis are substantially parallel.

23. The tray assembly of claim 13, wherein said holder is shaped like an inverted, truncated cone and wherein said holder axis and said crushable extension axis form an acute angle.

24. The tray assembly of claim 13 wherein said crushable extension is a pad.

25. A tray assembly adapted for engagement to an automotive cup holder comprising:
   a main tray;
   a holder perpendicularly affixed to said main tray;
   a side tray extending downwardly from said main tray;
   a crushable extension attached to an outside wall of said holder and oriented along a crushable extension axis, said crushable extension extending downwardly from said tray to the bottom of said holder and adapted to conform to the shape of the automotive cup holder;
   wherein said crushable extension comprises:
     a plurality of tier walls extending outwardly from said holder;

a plurality of tier faces perpendicularly joined to said tier walls; and an extension face perpendicularly joined to said tier walls; and wherein said tier walls and said tier faces form a pair of stair-stepped sidewalls of said crushable extension.

26. The tray assembly as set forth in claim 25 further comprising a circumferential support element extending upwardly from the tray assembly.

27. The tray assembly as set forth in claim 25 further comprising a circumferential support element extending downwardly from the tray assembly.

28. The tray assembly as set forth in claim 25 further comprising an inner support joined to said main tray; wherein said inner support is arched in shape and concentric with said holder.

29. The tray assembly as set forth in claim 25 wherein said side tray is downwardly recessed.

30. The tray assembly as set forth in claim 25 further comprising: at least one aperture in the side tray; wherein the aperture acts as a receptacle for a food container and maintains the food container in a vertical position.

31. The tray assembly of claim 30 wherein said aperture is hexagonal.

32. The tray assembly of claim 25 further comprising:
a second tray perpendicularly joined to said holder; and
wherein an angle created by said main tray and said second tray is obtuse.

33. The tray assembly of claim 25 further comprising:
a support structure affixed to the main tray, said support structure comprising:
  a circumferential support disposed at the perimeter of said main tray;
  a supplemental support affixed to said circumferential support and said main tray;
  wherein said supplemental support prevents said main tray from bending between said side tray and said holder; and
  wherein said main tray connects said side tray, said holder, and said support structure.

34. The tray assembly of claim 25 wherein said holder is substantially cylindrical and a holder axis and said crushable extension axis are substantially parallel.

35. The tray assembly of claim 25, wherein said holder is shaped like an inverted, truncated cone and wherein a holder axis and said crushable extension axis form an acute angle.

36. The tray assembly of claim 25 wherein said crushable extension is a pad.

* * * * *